United States Patent
Lee et al.

(10) Patent No.: US 7,466,692 B2
(45) Date of Patent: Dec. 16, 2008

(54) METHOD AND APPARATUS FOR PERFORMING QUALITY-OF-SERVICE CALCULATIONS ON PACKET-BASED NETWORKS

(75) Inventors: Minkyu Lee, Ringoes, NJ (US); James William McGowan, Whitehouse Station, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 741 days.

(21) Appl. No.: 10/936,990

(22) Filed: Sep. 9, 2004

(65) Prior Publication Data

US 2006/0050633 A1    Mar. 9, 2006

(51) Int. Cl.
*H04L 12/66*    (2006.01)
(52) U.S. Cl. .................. 370/352; 370/229; 370/230; 370/231; 370/232; 370/353; 370/354; 370/355; 370/356; 370/394
(58) Field of Classification Search .......... None
See application file for complete search history.

(56) References Cited

U.S. PATENT DOCUMENTS

| | | | | |
|---|---|---|---|---|
| 6,584,104 | B1 | 6/2003 | McGowan | 370/394 |
| 6,731,634 | B1 | 5/2004 | McGowan | 370/394 |
| 6,801,532 | B1 * | 10/2004 | Anandakumar et al. | 370/394 |
| 2001/0012300 | A1 * | 8/2001 | Raisanen | 370/429 |
| 2002/0154641 | A1 | 10/2002 | McGowan | 370/401 |
| 2004/0122680 | A1 | 6/2004 | McGowan et al. | 704/501 |
| 2005/0201414 | A1 * | 9/2005 | Awais | 370/468 |

OTHER PUBLICATIONS

U.S. Appl. No. 10/394,118, filed Mar. 21, 2003, M. Lee et al. "Low-Complexity Packet Loss Concealment Method for Voice-Over-IP Speech Transmission".
U.S. Appl. No. 10/430,120, filed May 6, 2003, M. Lee et al. "Method And Apparatus For the Detection Of Previous Packet Loss In Non-Packetized Speech".
ITU-T Recommendation G.711—Appendix 1: Series G: Transmission Systems and Media, Digital Systems and Networks, Digital Transmission systems—Terminal equipments—Coding of analogue signals by pulse code modulation, Pulse code modulation (PCM) of voice frequencies, Appendix I: A high quality low-complexity algorithm for packet loss concealment with G.711, Sep. 1999.
ITU-T Recommendation G.729—General Aspects of Digital Transmission Systems, Coding of Speech at 8 kbit/s Using Conjugate-Structure Algebraic-Code-Excited Linear-Prediction (CS-ACELP), Mar. 1996.

* cited by examiner

*Primary Examiner*—Chi H. Pham
*Assistant Examiner*—Raj K. Jain
(74) *Attorney, Agent, or Firm*—Kenneth M. Brown

(57) ABSTRACT

A method and apparatus for performing Quality-of-Service (QoS) calculations on packet-based communications networks using a QoS measure which is based on data included in non-lost packets, as well as on data included in lost packets, when the proper interpretation of the data in non-lost packets depends upon data in one of the lost packets. Two new QoS measures that address the limitations inherent in the prior art PLR (Packet Loss Rate) measure are introduced. The Packet Loss Distortion Rate (PLDR) measure determines both packets which are lost, as well as packets whose proper interpretation depends on one or more packets which have been lost. The Media Distortion Rate (MDR) measures the actual quantity of media material that is lost, regardless of how the material is grouped into individual packets.

20 Claims, 1 Drawing Sheet

METHOD AND APPARATUS FOR PERFORMING QUALITY-OF-SERVICE CALCULATIONS ON PACKET-BASED NETWORKS

FIELD OF THE INVENTION

The present invention relates generally to packet-based communications networks and more particularly to methods of measuring Quality-of-Service (QoS) in such networks under conditions of packet loss.

BACKGROUND OF THE INVENTION

Media, such as, for example, speech, audio and video, delivered on packet (or frame) based communications networks are subject to packet loss that can affect the quality of media codecs (encoding/decoding systems). Although attempts are made to minimize the impact of these losses by, for example (in the case of speech), generating speech replacement material—these are known as Packet Loss Concealment (PLC) algorithms—the quality of the resultant reconstructed signals usually suffers nonetheless as a result of packet loss. Many compression codecs have built-in PLC algorithms, although one can bypass those algorithms to enhance performance, using instead PLC algorithms enhanced for loss characteristics typical of different networks. Predicting the quality of this multitude of combinations of codecs and PLC algorithms is a problem of general interest, since it is a necessary step in defining the Quality-of-Service (QoS) of packet systems, such as Voice-over-IP (VOIP) or IP (Internet Protocol) Video.

Differences in the quality of the codecs and PLC algorithms are due, in part, to differences in the amount of media content that is distorted when loss occurs. The rate of packet loss is commonly referred to as the packet loss rate (PLR). Quality-of-Service measurement schemes invariably rely on this measure to determine transmission quality. In fact, the use of PLR pervades the industry, from network measurement boxes to network planning algorithms, in both the voice and video domains.

SUMMARY OF THE INVENTION

We have recognized that the PLR measure does not accurately measure the amount of media material that is actually lost, since material in one packet may be coded relative to material in other packets. In other words, the failure to receive one packet may make the material in other packets moot, since those packets cannot be interpreted correctly. Therefore, in accordance with the principles of the present invention, a method and apparatus for performing Quality-of-Service (QoS) calculations on packet-based networks is provided using a QoS measure which is advantageously based on data included in non-lost packets, as well as on data included in lost packets, when the proper interpretation of the data in non-lost packets depends upon data in one of the lost packets.

In particular, in accordance with certain illustrative embodiments of the present invention, one of two new QoS measures that address the limitations inherent in the PLR measure may be advantageously employed. In accordance with a first such illustrative embodiment of the invention, the Packet Loss Distortion Rate (PLDR) measure advantageously determines both packets which are lost, as well as packets whose proper interpretation depends on one or more packets which have been lost. All such packets (lost packets and non-lost packets which depend on a lost packet) are considered together to be "affected" packets. The PLDR may then be advantageously defined simply as the rate of such "affected" packets (e.g., the number of affected packets over a time interval divided by the total number of packets received over that time interval).

In accordance with a second such illustrative embodiment of the invention, the Media Distortion Rate (MDR) measures the actual quantity of media material that is lost, regardless of how the material is grouped into individual packets. Although use of the MDR may require additional knowledge of the codec and packet loss concealment algorithm, it provides a highly accurate measure of the quality of the received data.

DETAILED DESCRIPTION OF THE ILLUSTRATIVE EMBODIMENTS

Figure 1:
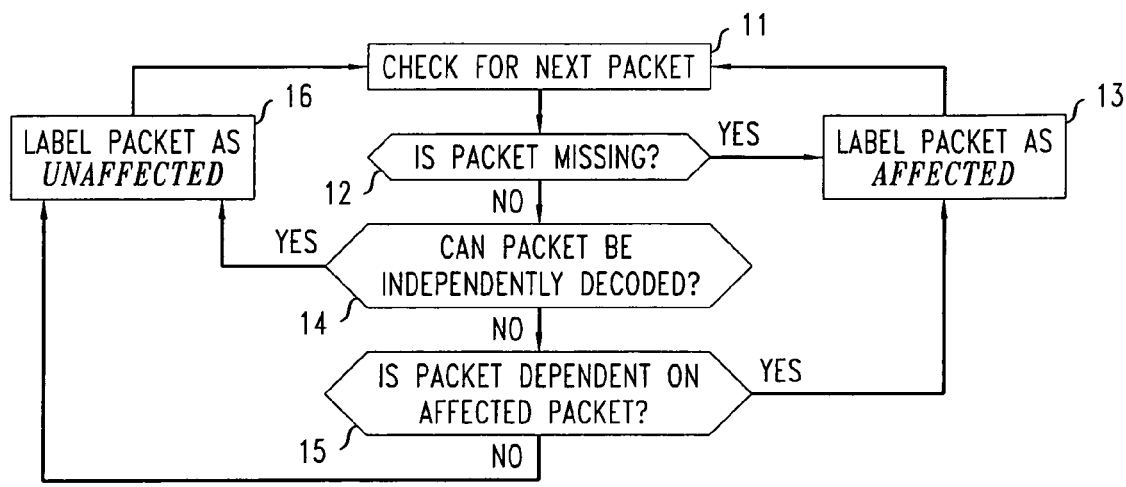
FIG. 1 shows a flowchart of a method for performing Quality-of-Service calculations on packet-based communications networks under conditions of packet loss in accordance with a first illustrative embodiment of the present invention using a Packet Loss Distortion Rate (PLDR) measure.

A First Illustrative Embodiment of the Invention using a PLDR Measure

In accordance with a first illustrative embodiment of the present invention, a Packet Loss Distortion Rate (PLDR) measure is advantageously used to measure Quality-of-Service in a packet-based communications network under packet loss conditions. In particular, the PLDR measure is based on the sum of the number of lost packets and the number of non-lost (i.e., received) packets whose proper interpretation depends on one or more packets which have been lost. Both of these together are referred to as "affected" packets. (As is well known to those skilled in the art, a packet in a packet-based communications network is defined as "lost" when it fails to reach its destination within some specified period of time for any reason whatsoever. In other words, a packet which arrives at its destination too late to be used in the decoding process— i.e., after the decoder is ready to decode that packet—is a "lost" packet, even though it may eventually arrive at its destination. Similarly, as used herein a "received" packet is defined to be one which is not "lost.")

In comparison with the prior art approach of using a PLR measure (which is based on only lost packets), the PLDR provides a far more appropriate measure of Quality-of-Service under conditions of packet loss. For example, video can be compressed such that the material in each packet is independently coded, so losing a packet only affects the video coded within that packet. However, the same video coding standard can be used more advantageously in such way that the material in each packet is coded relative to the early material. Suppose that in both cases the first content-bearing packet is lost. In the former case a distortion would appear, most likely in the upper left corner, for a single frame. In the latter case the entire display would be garbled. Using only the PLR, prior art QoS schemes that look at packet delivery would incorrectly rate these two video streams as identical.

In particular, the relationship between PLR and PLDR can take three forms. In the simplest case, the codec independently codes material in each packet, and a Packet Loss Concealment (PLC) algorithm, if used at all, effects no other packets. In this case, PLR=PLDR as there are no non-lost but nonetheless "affected" packets. Examples of this include G.711 coded voice with a very low-quality PLC algorithm, such as silence insertion, or certain implementations of packet repetition. (Note that G.711 is a well known coding standard fully familiar to those of ordinary skill in the art. In addition, silence insertion and packet repetition are two well known PLC algorithms also fully familiar to those of ordinary skill in the art.)

In some cases redundancy coding or retransmission may provide for complete delivery of media even when packet loss occurs. Examples include Reed-Solomon channel coding, and use of TCP/IP. (Reed-Solomon channel coding is a well known redundancy coding technique fully familiar to those of ordinary skill in the art. TCP/IP is a well known network transmission protocol also fully familiar to those of ordinary skill in the art.) In these cases, PLR>PLDR, and small to medium amounts of loss will have no detrimental effect on the receiver whatsoever, resulting in maximum quality. These methods are often not used because they require additional bandwidth, greater computational resources, increased transmission latency, or some combination of each of these factors.

Finally, in other cases the amount of distorted material exceeds the amount of lost material, or, PLR<PLDR. This is the most common case in current communications networks. One example is G.711 PLC, which smoothes the boundary between a lost packet and 3.75 msec (i.e., 30 digital samples) of immediately preceding material for 3.75 msec, or 30 digital samples, regardless of the packet size. Therefore, for a 10 msec lost packet, 13.75 msec of voice are distorted. (This is true of certain other PLC schemes designed for G.711 as well.) Other compression codecs, such as G.729 (also fully familiar to those of ordinary skill in the art), code with dependencies between frames and are more complex than G.711, so one lost 10 msec packet can result in a variable amount of distortion which may equal 50 msec or more.

Similarly, video coding techniques such as that used in MPEG, ITU-T/H.263 or the jointly developed MPEG/ITU codec H.264 can be particularly susceptible to large errors resulting from lost packets, since inter-coding of blocks and frames (i.e., coding one block or frame in terms of one or more previous ones) can allow a single lost packet to distort a literally unlimited amount of video. (MPEG, ITU-T/H.263 and H.264 are all well known video coding techniques fully familiar to those of ordinary skill in the art.) In fact, most video encoders are explicitly designed to be robust against a single lost packet corrupting the decoded stream indefinitely. A minimal level of robustness is typically required, since "intra-coded" blocks (i.e., coding a block without reference to any others) are used to reduce the cumulative effect of rounding errors that can occur between encoders and decoders, and the ability to change channels requires that intra-coded frame be inserted with some regularity. However, the frequency of forced intra-coding varies substantially between codecs, and forced intra-coding reduces the compression ratio achieved by the codec.

Note that the increase of PLDR relative to PLR may be intentional on the part of an algorithm that is attempting to smooth the transitions between replacement material and received material (as in G.711 PLC), or because the material in one packet is coded relative to the material in another (as in MPEG). Both situations occur in both voice and video coding.

There is no straightforward method for calculating the PLDR from only the PLR, even if one has complete knowledge of the codec and packet loss concealment—the exact pattern of loss matters. Consider, for example, a speech coding scheme in which a 10 msec lost packet affects the following 20 msec of material. If, within 100 packets, 2 packets are lost, the PLR=2/100=2%. However, the PLDR can take on any of a number of possible values.

For example, assume that packet 1 is lost and material in packets 1-3 are directly impacted by that loss. (The packet numbers used herein specify ordinal packet numbers, such as those taken from an RTP header.) In other words packet 1 affects the following two packets (as well as itself). Further assume that one other packet—either packet 2, 3, 4 or 5—is the other lost packet (of the 2 lost packets). Finally, assume that each of these packets also affect each of the two following packets as well—in other words, packet 2 affects packets 2-4, packet 3 affects packets 3-5, packet 4 affects packets 4-6, and packet 5 affects packets 5-7. Then each of these situations has the same PLR value, but not necessarily the same PLDR values. The resultant PLDR values are shown in the following table:

| first lost packet | packets affected by first lost packet | second lost packet | packets affected by second lost packet | all affected packets | PLR | PLDR |
|---|---|---|---|---|---|---|
| 1 | 1-3 | 2 | 2-4 | 1-4 | .02 | .04 |
| 1 | 1-3 | 3 | 3-5 | 1-5 | .02 | .05 |
| 1 | 1-3 | 4 | 4-6 | 1-6 | .02 | .06 |
| 1 | 1-3 | 5 | 5-7 | 1-3, 5-7 | .02 | .06 |

Therefore, in accordance with the first illustrative embodiment of the present invention, each individual packet is advantageously marked as "affected" or "unaffected." Then, the PLDR measure may be advantageously calculated as:

$$PLDR = \left(\frac{\text{affected packets}}{\text{affected packets} + \text{unaffected packets}}\right) = \left(\frac{\text{affected packets}}{\text{total packets}}\right) \quad (1)$$

Note that this calculation can advantageously be performed readily in the DSP (Digital Signal Processor) or in the host processor of a gateway receiving IP (internet Protocol) packets and removing the media from the IP domain. However, the calculation could alternatively be performed by any other device handling the packets.

FIG. 1 shows a flowchart of a method for performing Quality-of-Service calculations on packet-based communications networks under conditions of packet loss in accordance with a first illustrative embodiment of the present invention using a Packet Loss Distortion Rate (PLDR) measure. Specifically, the operation of the illustrative method of FIG. 1 operates in a continuous loop, beginning in block 11 by checking for a next packet to be received. Then, in decision block 12, it is determined if the packet is missing (i.e., has not been timely received). If it is missing, block 13 labels the packet as "affected" and flow returns to block 11 to check for the next packet.

If, on the other hand, the packet is not missing (as determined by decision block 12), decision block 14 determines whether the given (received) packet can be independently decoded. That is, it is determined whether the proper decoding of the given packet requires data contained in one or more previous packets. If the packet can in fact be independently decoded (i.e., it is not dependent upon the data contained in other packets), block 16 labels the packet as "unaffected" and flow returns to block 11 to check for the next packet.

If, on the other hand, the packet cannot be independently decoded (i.e., it is dependent upon the data contained in one or more other packets), decision block 15 determines whether the given packet is dependent on one or more packets which have been previously labeled as "affected". If the given packet does depend on one or more "affected" packets, then it is also labeled as "affected" by block 13 and flow returns to block 11 to check for the next packet. If, however, the given packet does not depend on any "affected" packets, then it is labeled as "unaffected" by block 16 and flow returns to block 11 to check for the next packet. Thus, at any time, the PLDR measure can be determined with the use of Equation (1) as shown and described above.

A Second Illustrative Embodiment of the Invention Using an MDR Measure

The PLDR is a reasonable estimate of affected (e.g., speech) material. However, in general, only a portion of the media within a given packet may actually be affected. For example, in G.711 PLC, a 3.75 msec (i.e., 30 sample) segment of speech is affected regardless of the packet size (as described above). The PLDR counts the entire packet as affected, even though the packet may hold as much as, for example, 40 msec of material or more in an IP telephony application.

Thus, in accordance with a second illustrative embodiment of the present invention, a Media Distortion Rate (MDR) measure is used to compensate for this by counting the amount of actual media content distorted by the packet loss. In particular, the MDR measure is based on the sum of the number of media samples contained in the lost packets and the number of media samples contained in non-lost (i.e., received) packets whose proper interpretation depends on data contained in one or more packets which have been lost. (Both of these together are referred to as "affected" samples.)

In the current example of G.711 PLC with 40 msec of material per packet, a single lost packet in a sequence of 100 would yield a PLR of 1/100=1%, a PLDR of 2/100=2%, but, in accordance with the second illustrative embodiment of the present invention, a MDR of (320+30)/(100*320)=1.09% (where 320 is the number of G.711 audio samples in a 40 msec packet). For voice transmission as in this example, the MDR may be advantageously used to count digital PCM (Pulse Code Modulation) voice samples; for video signals, the MDR may be advantageously used to count pixels.

Note that use of the MDR advantageously has the additional property of being unaffected by packet size. For example, a single packet typically holds anywhere from 10 to 40 msec of voice. Neither the PLR nor PLDR can account for the perceived difference in packet loss on these two streams, and will typically make use of additional weighting factors to convert the packet loss to an actual QoS score. Use of the MDR advantageously requires no such weighting factor.

Calculating the MDR in accordance with the second illustrative embodiment of the present invention is similar to calculating the PLDR in accordance with the first illustrative embodiment of the present invention. However, the algorithm advantageously makes use of knowledge of how the PLC or codec is implemented. Thus, it would be most convenient to implement the calculation of the MDR in the DSP responsible for the PLC or codec.

Therefore, in accordance with the second illustrative embodiment of the present invention, each individual sample is advantageously marked as "affected" or "unaffected." Then, the MDR measure may be advantageously calculated as:

$$MDR = \left(\frac{\text{affected samples}}{\text{affected samples} + \text{unaffected samples}}\right) = \left(\frac{\text{affected samples}}{\text{total samples}}\right) \quad (2)$$

Figure 2:
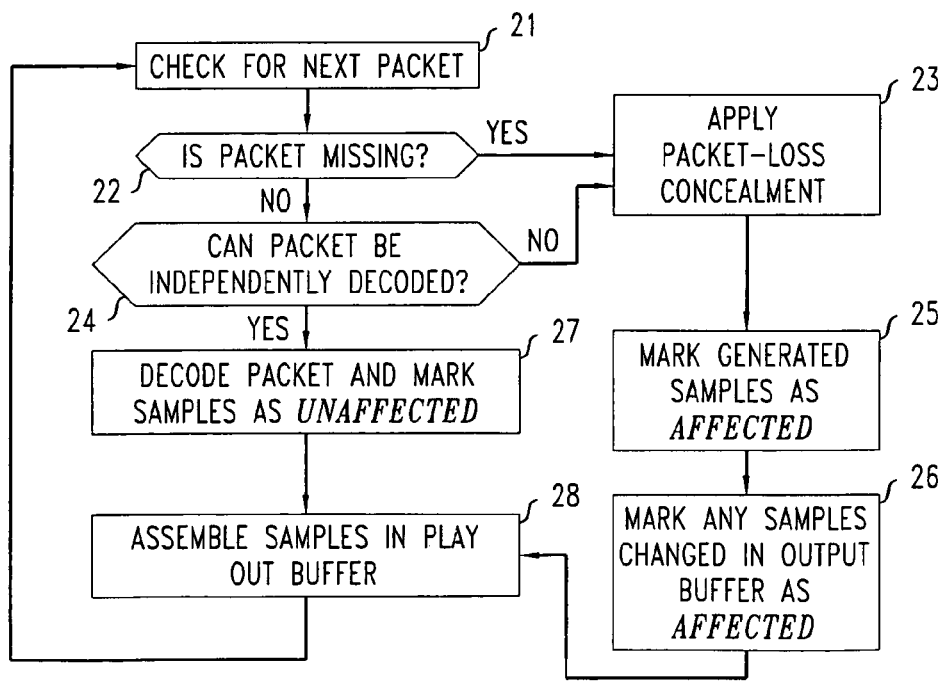
FIG. 2 shows a flowchart of a method for performing Quality-of-Service calculations on packet-based communications networks under conditions of packet loss in accordance with a second illustrative embodiment of the present invention using a Media Distortion Rate (MDR) measure.

FIG. 2 shows a flowchart of a method for performing Quality-of-Service calculations on packet-based communications networks under conditions of packet loss in accordance with a second illustrative embodiment of the present invention using a Media Distortion Rate (MDR) measure. Specifically, the operation of the illustrative method of FIG. 2, like that of the illustrative method of FIG. 1, operates in a continuous loop, beginning in block 21 by checking for a next packet to be received. Then, in decision block 22, it is determined if the packet is missing (i.e., has not been timely received).

If the given packet is not missing, decision block 24 determines whether the packet can be independently decoded (i.e., it is not dependent upon the data contained in other packets). If either the packet is missing (as determined by decision block 22) or if the packet is not missing but cannot be independently decoded (as determined by decision block 24), then (i) block 23 applies the packet loss concealment algorithm which is being employed; (ii) block 24 marks the generated samples as "affected," and (iii) block 26 marks any samples changed in the output buffer as "affected." Then flow proceeds first to block 28 which assembles the samples in the play out buffer, and then loops back to block 21 to check for the next packet.

If, on the other hand, the given packet is not missing (as determined by decision block 22) and the packet can be independently decoded (as determined by decision block 24), block 27 decodes the given packet and marks the resultant samples as "unaffected." Then flow also proceeds first to block 28 which assembles the samples in the play out buffer, and then loops back to block 21 to check for the next packet. Thus, at any time, the MDR measure can be determined with the use of Equation (2) as shown and described above.

A Third Illustrative Embodiment of the Invention Using a Weighted MDR Measure

In some cases, completely lost material presents more of a distortion to the user than material that is received but is otherwise affected. This is sometimes the case in the G.711 PLC example, in which the affected 30 speech samples following a packet loss suffer varying degrees of distortion from their correct values. Therefore, in accordance with a third illustrative embodiment of the present invention, a "weighted" MDR measure could be advantageously used. In particular, for each affected sample, or for the affected sample group as a whole, a weight may be advantageously applied such that the samples are differentially counted in the overall MDR value.

A Fourth Illustrative Embodiment of the Invention Using PLDR with Burst Ratios

In U.S. patent application Publication No. US 2002/0154641 A1, "Burst Ratio: A Measure Of Bursty Loss On Packet-Based Networks, filed on Feb. 1, 2001 by James W. McGowan as U.S. patent application Ser. No. 09/773,799 and commonly assigned to the assignee of the present invention, a "burst ratio" is defined for use as a measure for the burstiness of a packet-based network. In particular, the burst ratio, as defined therein, is based on (a) the observed packet loss for the received packet stream over a period of time, and (b) the expected packet loss for the received packet stream for a random loss packet-based network. (Similarly, a "burst" is defined therein as a contiguous sequence of lost packets, the number of which is defined to be the "length" of the burst.) U.S. patent application Publication No. US 2002/0154641 A1 is hereby incorporated by reference as if fully set forth herein.

In accordance with a fourth illustrative embodiment of the present invention, both lost packets and non-lost (i.e., received) packets whose proper interpretation depends on one or more packets which have been lost (i.e., "affected" packets), rather than just the lost packets, may be advantageously used to compute a burst ratio in an otherwise similar manner to that described in U.S. patent application Publication No. US 2002/0154641 A1. In other words, the "burst ratio," as now redefined herein, is calculated in accordance with the fourth illustrative embodiment of the present invention based on (a) the observed "affected" packet sequence for the received packet stream over a period of time, and (b) the expected "affected" packet sequence for the received packet stream for a random loss packet-based network. (Similarly, a "burst," as now redefined herein, is a contiguous sequence of "affected" packets, the number of which is defined to be the "length" of the burst.) The burst ratio so calculated may then be advantageously used as a Quality-of-Service measure in accordance with this fourth illustrative embodiment of the present invention. (Note that extensions of the specific teachings of U.S. patent application Publication No. US 2002/0154641 A1 to incorporate the principles of the present invention in accordance with this fourth illustrative embodiment thereof will be obvious to one skilled in the art in view of the teachings of the present invention herein.)

ADDENDUM TO THE DETAILED DESCRIPTION

It should be noted that all of the preceding discussion merely illustrates the general principles of the invention. It will be appreciated that those skilled in the art will be able to devise various other arrangements, which, although not explicitly described or shown herein, embody the principles of the invention, and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. It is also intended that such equivalents include both currently known equivalents as well as equivalents developed in the future— i.e., any elements developed that perform the same function, regardless of structure.

Thus, for example, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown. Thus, the blocks shown, for example, in such flowcharts may be understood as potentially representing physical elements, which may, for example, be expressed in the instant claims as means for specifying particular functions such as are described in the flowchart blocks. Moreover, such flowchart blocks may also be understood as representing physical signals or stored physical data, which may, for example, be comprised in such aforementioned computer readable medium such as disc or semiconductor storage devices.

We claim:

1. A method for calculating a Quality-of-Service measure in a packet-based communications network under packet loss conditions, each packet of said packet-based communications network comprising packet header information and data, the method comprising the steps of:

identifying, over a given time interval, one or more lost packets;

identifying, over said given time interval, one or more received packets which comprise data whose proper interpretation is based on data comprised in one or more of said identified lost packets; and calculating said Quality-of-Service measure for said given time interval based on both said identified lost packets and on said identified received packets which comprise data whose proper interpretation is based on data comprised in one or more of said identified lost packets.

2. The method of claim 1 wherein said Quality-of-Service measure for said given time interval is calculated based on a number of said identified lost packets over said given time interval and on a number of said identified received packets which comprise data whose proper interpretation is based on data comprised in one or more of said lost packets over said given time interval.

3. The method of claim 2 wherein said Quality-of-Service measure for said given time interval is calculated by computing a ratio of (i) a summation of said number of said identified lost packets over said given time interval and said number of said identified received packets which comprise data whose proper interpretation is based on data comprised in one or more of said lost packets over said given time interval, to (ii) a summation of said number of said number of said identified lost packets over said given time interval and a total number of received packets over said given time interval.

4. The method of claim 1 wherein said Quality-of-Service measure for said given time interval is calculated based on a number of data samples comprised in said identified lost packets over said given time interval and on a number of data samples which are comprised in said identified received packets and for which proper interpretation of said data samples is based on said data samples comprised in one or more of said lost packets over said given time interval.

5. The method of claim 4 wherein said Quality-of-Service measure for said given time interval is calculated by computing a ratio of (i) a summation of said number of data samples comprised in said identified lost packets over said given time interval and said number of data samples which are comprised in said identified received packets and for which proper interpretation of said data samples is based on said data samples comprised in one or more of said lost packets over said given time interval, to (ii) a summation of said number of data samples comprised in said identified lost packets over said given time interval and a total number of data samples comprised in packets received over said given time interval.

6. The method of claim 4 wherein said data samples comprise speech samples.

7. The method of claim 4 wherein said data samples comprise video pixels.

8. The method of claim 4 wherein said Quality-of-Service measure for said given time interval is calculated by computing a ratio of
   (i) a weighted summation of said number of data samples comprised in said identified lost packets over said given time interval and said number of data samples which are comprised in said identified received packets and for which proper interpretation of said data samples is based on said data samples comprised in one or more of said lost packets over said given time interval, to
   (ii) a weighted summation of said number of data samples comprised in said identified lost packets over said given time interval and a total number of data samples comprised in packets received over said given time interval, wherein each of said data samples has associated therewith a corresponding weighting factor with which said data sample is multiplied thereby prior to performing said weighting summations.

9. The method of claim 1 wherein said Quality-of-Service measure for said given time interval is calculated as a burst ratio, wherein the burst ratio is based on a number of said identified lost packets over said given time interval and on a number of said identified received packets which comprise data whose proper interpretation is based on data comprised in one or more of said lost packets over said given time interval.

10. The method of claim 9 wherein the burst ratio comprises a ratio of
    (i) an average length of observed bursts over said given time interval, each of said observed bursts comprising a contiguous sequence of packets each of which is one of said identified lost packets over said given time interval or one of said identified received packets which comprise data whose proper interpretation is based on data comprised in one or more of said lost packets over said given time interval, to
    (ii) an average length of observed bursts expected over said given time interval in accordance with a random loss model for said packet-based communications network.

11. A computer readable medium having computer executable instructions for calculating a Quality-of-Service measure in a packet-based communications network under packet loss conditions, each packet of said packet-based communications network comprising packet header information and data, said data not including said packet header information, the computer executable instructions comprising steps to:
    identify, over a given time interval, one or more lost packets;
    identify, over said given time interval, one or more received packets which comprise data whose proper interpretation is based on data comprised in one or more of said identified lost packets; and
    calculate said Quality-of-Service measure for said given time interval based on both said identified lost packets and on said identified received packets which comprise data whose proper interpretation is based on data comprised in one or more of said identified lost packets.

12. The computer executable instructions of claim 11 wherein said Quality-of-Service measure for said given time interval is calculated based on a number of said identified lost packets over said given time interval and on a number of said identified received packets which comprise data whose proper interpretation is based on data comprised in one or more of said lost packets over said given time interval.

13. The computer executable instructions of claim 12 wherein said Quality-of-Service measure for said given time interval is calculated by computing a ratio of
    (i) a summation of said number of said identified lost packets over said given time interval and said number of said identified received packets which comprise data whose proper interpretation is based on data comprised in one or more of said lost packets over said given time interval, to
    (ii) a summation of said number of said number of said identified lost packets over said given time interval and a total number of received packets over said given time interval.

14. The computer executable instructions of claim 11 wherein said Quality-of-Service measure for said given time interval is calculated based on a number of data samples comprised in said identified lost packets over said given time interval and on a number of data samples which are comprised in said identified received packets and for which proper interpretation of said data samples is based on said data samples comprised in one or more of said lost packets over said given time interval.

15. The computer executable instructions of claim 14 wherein said Quality-of-Service measure for said given time interval is calculated by computing a ratio of
    (i) a summation of said number of data samples comprised in said identified lost packets over said given time interval and said number of data samples which are comprised in said identified received packets and for which proper interpretation of said data samples is based on said data samples comprised in one or more of said lost packets over said given time interval, to
    (ii) a summation of said number of data samples comprised in said identified lost packets over said given time interval and a total number of data samples comprised in packets received over said given time interval.

16. The computer executable instructions of claim 14 wherein said data samples comprise speech samples.

17. The computer executable instructions of claim 14 wherein said data samples comprise video pixels.

18. The computer executable instructions of claim 14 wherein said Quality-of-Service measure for said given time interval is calculated by computing a ratio of
    (i) a weighted summation of said number of data samples comprised in said identified lost packets over said given time interval and said number of data samples which are comprised in said identified received packets and for which proper interpretation of said data samples is based on said data samples comprised in one or more of said lost packets over said given time interval, to
    (ii) a weighted summation of said number of data samples comprised in said identified lost packets over said given time interval and a total number of data samples comprised in packets received over said given time interval, wherein each of said data samples has associated therewith a corresponding weighting factor with which said data sample is multiplied thereby prior to performing said weighting summations.

19. The computer executable instructions of claim 11 wherein said Quality-of-Service measure for said given time interval is calculated as a burst ratio, wherein the burst ratio is based on a number of said identified lost packets over said given time interval and on a number of said identified received packets which comprise data whose proper interpretation is based on data comprised in one or more of said lost packets over said given time interval.

20. The computer executable instructions of claim 19 wherein the burst ratio comprises a ratio of
(i) an average length of observed bursts over said given time interval, each of said observed bursts comprising a contiguous sequence of packets each of which is one of said identified lost packets over said given time interval or one of said identified received packets which comprise data whose proper interpretation is based on data comprised in one or more of said lost packets over said given time interval, to
(ii) an average length of observed bursts expected over said given time interval in accordance with a random loss model for said packet-based communications network.

* * * * *